United States Patent Office 2,711,966
Patented June 28, 1955

2,711,966

PARTING COMPOSITION

Thomas T. Watson, Coatesville, and Albert Riggall, Prospect Park, Pa., assignors to Lukens Steel Company, Coatesville, Pa., a corporation of Pennsylvania No Drawing. Application December 1, 1949,
Serial No. 130,598

8 Claims. (Cl. 106—193)

The present invention relates to a novel parting composition or weld-preventing composition for use in the hot rolling of a multiplicity of metal ingots, slabs or clad plates in the form of packs.

In the recently developed art of pack-rolling of metal ingots or slabs, a plurality of the metal members—that is, two or more ingots or slabs—is assembled into a pack with a parting or weld-preventing composition between them. Similarly, in the production of clad steel sheets or plates by pack rolling, two slabs or plates of the cladding metal are sandwiched between two backing ingots or slabs, a parting material being provided between the two confronting faces of the cladding metal members.

Great difficulty is encountered, however, in preventing the hot ingots, slabs or clad plates from welding together in places during heating and the subsequent rolling. Various weld-preventing materials, briefly referred to herein as "parting" compositions or "parting" materials, have been suggested for use in the pack rolling of ingots, slabs and clad plates. All these, however, have been attended by various disadvantages and their use has had definite limitations which have held back considerably the art of pack-rolling. For example, mixtures of high melting point inorganic powdered materials in liquid binders such as water-glass, common lacquers and lacquer-like mixtures, gum or resin solutions and the like, have many disadvantageous properties which either render their use impossible or commercially undesirable. These have been due in part to the fact that these compositions unevenly coated the rough surfaces of the metal members causing sticking at thinly coated points and scoring or scratching at thickly coated areas; and also, with respect to the organic binders, to the fact that during the heat treatment the carbon liberated deleteriously affected the surfaces of certain of the confronting metal members. With respect to the latter factor the stainless steels are particularly affected by carbon pick up or carbonization due to the decomposition of hydrocarbon materials in contact therewith. For example the variety of stainless steels containing 18% chromium and 8% nickel are particularly susceptible to carbonization which decreases the metal's corrosion resistance, while other stainless steels such as those containing chromium but no nickel exhibit adverse alterations in hardness and other physical properties when the prior parting compositions containing organic binders were employed. In this regard the dried coatings of the prior parting compositions containing lacquer-like binders have been found to exhibit widely varying carbon contents depending upon the humidity at the time at which the parting composition was applied. Thus standardized procedures for reducing the carbon picked up by certain of the metals could not be practiced and erratic results were obtained. Moreover, it was often not feasible, using these prior compositions, to place the packs vertically in the soaking pits (an expedient of great importance since it permits a greater number of packs to be heated at one time) because when the binder decomposed, the entire coating disintegrated and the powdered material fell away from the faces, leaving the high points of the confronting faces in contact and allowing them to weld together. In addition the slow drying characteristics of many of the prior parting compositions hindered their use because of undue slowing down of production.

It is, therefore, one object of the present invention to provide a parting composition which overcomes the disadvantages encountered in the prior compositions and materials employed to prevent welding during pack rolling.

A further object is to provide a parting composition which does not deleteriously affect, as by carbonization, the metal members to which it is applied, during heat treatment.

A further object is to provide a parting composition in liquid, easily applicable form, which will form a film of uniform thickness over the surfaces of the metal member or members to which it is applied.

Another object is to provide a parting composition that possesses very rapid drying properties.

Still another object is to provide a parting composition which, during heat treatment, does not disintegrate exposing metal surfaces to which it is applied, thus permitting the packs to be placed vertically in the soaking pit.

Still another object is to provide a parting composition which besides performing in the above-discussed manner, spreads evenly and functions as a mild abrasive during hot rolling of the pack, providing an exceptionally smooth surface requiring, in many instances, no further finishing.

Other objects will be apparent from a consideration of the following specification and claims.

The parting composition of the present invention comprises, in controlled proportions, a powdered inorganic compound which is substantially infusible at the highest temperatures encountered during the heating and rolling of the metal members; a small amount of a cellulose derivative binding agent selected from the group consisting of cellulose ethers and cellulose esters, and a volatile solvent therefor.

The parting compound of the present invention is advantageously employed in any operation involving the simultaneous hot rolling of a multiplicity of metal members in a pack where it is desired to prevent the welding of confronting metal member faces. Such an operation is employed not only in rolling a multiplicity of carbon steel ingots (as cast), slabs and plates in the form of packs, and pack rolling during the cladding of relatively inexpensive steel such as plain carbon steel with a corrosion-resistant metal such as the chromium-containing steels, or nickel and nickel alloys, and the like; but also in pack rolling ingots, slabs or plates of other metals such as stainless steel, copper-nickel alloys, copper and copper alloys, and bronze. The stainless steels are well-known examples of the corrosion-resistant chromium-containing steels and usually contain from about 7% to about 25% chromium. Typical compositions are, besides the iron content, 13% chromium and 0.35% carbon; 18% chromium and 0.1% carbon; 18% chromium, 8% nickel and 0.08% carbon, and 25% chromium and 20% nickel. Another example of a corrosion-resistant chromium-containing steel is "Inconel" (which is a registered tradename of the International Nickel Company) and usually contains in the neighborhood of 80% nickel, 14% chromium and 6% iron.

Referring to the inorganic powdered material employed in the parting composition, it is any inorganic compound or mixtures thereof capable of being rendered into fine particle size as hereinafter discussed, and which is substantially infusible, inert to the particular metal and non-decomposible at or below the highest temperature encountered during the heating of the assembly. In other words, the inorganic material should not fuse or melt at the highest temperatures encountered to an extent to cause agglomeration or fluxing. However, the material may soften somewhat such that it loses it grittiness so that during rolling it acts as a mild abrasive, polishing the confronting faces without unduly scoring and scratching the surfaces. For instance, in the case the assembly is to be heated to about 2,250° F., the inorganic material employed in such case should have a fusion or melting point above 2,250° F., although it may be softened somewhat, as stated, at or below that temperature. Inorganic materials that are applicable are, for example, the various high-melting metallic oxides such as magnesium oxide, zirconium oxide, aluminum oxide, titanium oxide, the chromium oxides, such as chromium sesquioxide, and the like, and the various high-melting silicates such as mica, magnesium silicate and the like. The inorganic material employed need not be the pure oxide or silicate. For instance, naturally-occurring chromium oxide in the form of chromite (an iron oxide-chromium oxide complex) or calcined periclase (a magnesium oxide-containing ore) may be employed.

As stated, the inorganic compound or compounds employed will be in fine particle size and will generally be substantially entirely of a fineness smaller than 100 mesh. The particle size employed will depend somewhat upon the type of metal of the metal members. For instance, in cladding operations, wherein a base metal is clad with stainless steel or nickel, a fine particle size on the order of smaller than 350 mesh is particularly desirable in order to obtain extra smooth surfaces. Of especially advantageous utility in this regard are the precipitated chromium oxides such as precipitated chromium sesquioxide. Because of the nature of their manufacture these materials are of very fine particle size, the particles generally ranging between about ½ micron to 5 microns in size.

Referring to the binding agent employed, it is a cellulose derivative selected from the group consisting of the cellulose ethers and esters including cellulose acetate and cellulose nitrate, the latter often being referred to as nitrocellulose. Of the cellulose ethers, ethyl cellulose is the preferred binding agent, and those ethyl celluloses having an ethoxy content of between about 47% and about 50% are particularly advantageous. Of the cellulose esters and the cellulose derivatives in general, cellulose nitrate is preferred. The cellulose derivatives are available on the market in various solid forms as well as in very concentrated solutions. For the purposes of the present invention, the particular physical form of the cellulose derivative employed in preparing the parting composition is immaterial so long as the proportion of cellulose derivative in the composition is within the ranges hereinafter set forth.

With respect to the solvent employed, it may be selected from a wide variety of volatile non-aromatic organic liquids in which the cellulose derivative employed is soluble in the amounts hereinafter set forth. Especially suitable liquids in this regard are the lower alkyl esters, of the lower saturated aliphatic acids having from 1 to 5 carbon atoms, especially the acetates, such as methyl acetate, ethyl acetate, isopropyl acetate, butyl acetate, amyl acetate and the like. Of these, ethyl acetate is preferred. These liquids may be in relatively pure form or in denatured form as is sometimes the case with commercial products of this type for it has been found that the small amount of denaturing material employed does not significantly affect the properties of the solvent. While it is preferred that the solvent employed consist essentially of an ester, as above-described, a solvent comprising a mixture of esters, or of one or more esters, and a minor proportion of another volatile solvent or solvents, such as the lower aliphatic alcohols, for instance, methyl alcohol, ethyl alcohol, propyl alcohol, and the like, or lower aliphatic ketones, such as acetone, may be employed. It should be noted, that unlike lacquer and lacquer-like compositions the composition of the present invention will be substantially free of a "diluent," that is, an aromatic hydrocarbon such as solvent naptha, toluol and the like, in which cellulose derivatives are insoluble but which, when mixed with a true solvent for the cellulose derivative, provides a liquid in which the cellulose derivative may be soluble but in which the cellulose derivative precipitates upon evaporation of a portion of the true solvent. Thus the term "solvent" is used herein in its customary sense as meaning a liquid of the type described consisting substantially entirely of a solvent for the cellulose derivative.

The relative proportion of the inorganic material to solution of cellulose derivative, and especially the proportion of cellulose derivative in the solution, are important in order to realize the advantages of the present invention. Referring to the solution of the cellulose derivative in the solvent, the concentration of the cellulose derivative therein will be unusually low and will generally be less than about 4%, by weight, and may even be as low as about .04%. Preferably, however, the concentration of the cellulose derivative in the solvent will be between about 0.2% and about 0.8%. In determining the relative proportions of cellulose derivative solution to powdered inorganic material the density of the inorganic material and the amount of reduction in thickness of the assembly during rolling are generally taken into consideration. Thus the greater these two factors, the greater the volume of powdered inorganic material employed. In any event, the amount of inorganic material employed will generally be between about ⅓ volume and about 3 volumes thereof per volume of cellulose derivative solution.

It will be noted from the above that the proportion of cellulose derivative in the solution is very low, and that the proportion of powdered inorganic material is relatively high. Nevertheless, upon application to a metal surface in the preparation of the assembly to be pack rolled a tough uniform coating is formed. And this coating will not disintegrate during the heating of the assemblies so that the assemblies may be conveniently placed vertically in the soaking pit without danger of the confronting metal surfaces becoming exposed in places resulting in "sticking." The parting composition also exhibits very rapid drying properties in some cases drying twice as fast as the better of the prior parting composition. In addition, it has been found that the carbon content of the dried coating is relatively consistent and independent of changes in humidity. Of prime importance, however, is the fact that during heating no significant carbon pick-up by metal surfaces, especially stainless steel surfaces, which are particularly sensitive, has been encountered with the parting composition of the present invention. Carbon pick-up during decomposition of the organic binding material has, as stated, been a problem which has seriously hampered the use of parting compositions containing organic binding materials.

In preparing the composition the order of addition of the various constituents is immaterial so long as a homogeneous mixture is obtained. However, it is generally preferred to form a solution of the cellulose derivative in the solvent and then add the inorganic material thereto. In practice, the solution of cellulose derivative and solvent is made up and stored in closed containers, and before use, portions thereof are taken and mixed with the desired amount of inorganic material. Because of the volatility of the solvent it is, of course, desirable to keep the composition in a closed container prior to use.

The parting composition, which is in the form of a paint, may be applied in any manner to at least one of the confronting surfaces of the members it is desired to prevent from welding together when the metal members are assembled into packs. Thus in the pack rolling of ingots or slabs the parting composition is merely applied to one or both of the broad faces which will confront each other when the ingots or slabs are assembled into a pack. In a cladding operation, wherein pack rolling is employed and where two plates of the cladding metal are sandwiched between two plates or slabs of the backing metal, the parting composition may be applied to one or both of the broad faces of the cladding metal plates which will confront each other in the assembled pack. There is, of course, no parting composition between each cladding metal plate and its respective backing metal member and thus during the hot rolling each cladding metal member becomes securely welded to its respective backing member in accordance with well-known practice. Generally the composition may be applied with a brush, although spraying or merely pouring it on the surface of the plate, slab or ingot may suffice.

In determining the amount of parting composition to be applied to the face of the plate, ingot or slab, the amount of reduction in thickness of the plate, slab or ingot (or, in other words, the increase in the area of the face) is taken into consideration. The amount of parting composition applied must be sufficient to spread to the area of the metal sheet or plate to which each plate, ingot or slab is to be rolled and prevent welding adhesion of the confronting faces, without leaving an excess of the composition to score the plate surfaces. For example, in the case of a stainless steel cladding operation, where the ratio of reduction in thickness is on the order of 10:1, approximately 30 cc. of parting composition is required per 250 square inches of surface area coated.

The following examples illustrate the preparation of the parting composition of the present invention and its use, and are not intended to limit the scope of the invention in any way:

*Example I*

Cellulose nitrate was dissolved in commercial denatured ethyl acetate to provide a concentration of 0.4% by weight. With this solution was thoroughly mixed an equal volume of chromium sesquioxide.

*Example II*

In this example a parting composition prepared as described in Example I was applied to one broad face each of two stainless steel slabs 40" long, 50" wide and 4" thick.

Considerable modification is possible in the selection of solvent and inorganic material as well as in the methods of applying the parting composition without departing from the scope of the invention.

We claim:

1. A parting composition adapted for the hot pack-working of a plurality of metal members comprising a homogeneous suspension of inorganic material, which is substantially infusible and non-decomposable at the highest temperature encountered during the hot working operation, and having a particle size smaller than 100 mesh, in a solution of a cellulose derivative selected from the group consisting of cellulose ethers and cellulose esters in a volatile organic non-aromatic solvent therefor, the concentration of said cellulose derivative in said solvent being between about 0.04% and about 4% by weight, and the proportion of said inorganic material to said solution being about 3 volumes of the former per volume of the latter.

2. The parting composition of claim 1 wherein the inorganic material has a particle size smaller than 350 mesh.

3. The parting composition of claim 1 wherein the inorganic material is a precipitated chromium oxide.

4. The parting composition of claim 1 wherein the cellulose derivative is ethyl cellulose.

5. The parting composition of claim 1 wherein the inorganic material is a magnesium oxide.

6. The parting composition of claim 1 wherein the inorganic material is a zirconium oxide.

7. The parting composition of claim 1 wherein the inorganic material is an aluminum oxide.

8. The parting compound of claim 1 wherein the inorganic material is a titanium oxide.

References Cited in the file of this patent

UNITED STATES PATENTS

| Number | Name | Date |
|---|---|---|
| 321,693 | Craig | July 7, 1885 |
| 704,285 | Allis | July 8, 1902 |
| 1,860,532 | Ensminger | May 31, 1932 |
| 1,874,785 | Miller et al. | Aug. 30, 1932 |
| 1,955,547 | Ingersoll | Apr. 17, 1934 |
| 2,059,088 | Childs | Oct. 27, 1936 |
| 2,367,375 | Rector | Jan. 16, 1945 |
| 2,407,146 | Fagan | Sept. 3, 1946 |
| 2,422,429 | Main-Smith | June 17, 1947 |
| 2,442,864 | Schneider | June 8, 1948 |
| 2,593,460 | Johnson | Apr. 22, 1952 |